United States Patent Office 3,027,406
Patented Mar. 27, 1962

3,027,406
3-HYDROXY-3-BIPHENYLYLHEPTANOIC ACID
William A. Bolhofer, Frederick, Pa., assignor to Merck & Co., Inc., Rahway, N.J., a corporation of New Jersey
No Drawing. Filed Jan. 18, 1960, Ser. No. 2,852
3 Claims. (Cl. 260—520)

This invention relates to a novel composition of matter and to a method for preparing it. In particular, the invention relates to 3-hydroxy-3-p-biphenylylheptanoic acid having the structural formula:

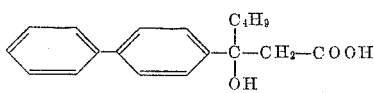

as well as to the alkali metal and alkaline earth metal salts thereof.

3-hydroxy-3-p-biphenylylheptanoic acid has been found to inhibit the biosynthesis of cholesterol in liver homogenates in vitro and accordingly the acid and its salts which, in vivo, would hydrolyze to the free acid, are potentially useful in lowering blood cholesterol levels in humans which is considered an important function of chemotherapeutic agents for the treatment of atherosclerosis.

The 3-hydroxy-3-p-biphenylylheptanoic acid of this invention and its salts can be prepared by various methods. A process which has been found to be particularly well adapted to the preparation of these compounds is the Reformatsky reaction which employs readily available intermediates which can be reacted with a minimum of difficulty. This process comprises reacting an alpha-haloacetate, such as a lower alkyl chloro-, bromo- or iodoacetate with p-phenylvalerophenone in the presence of zinc.

The reaction is preferably carried out in the presence of an anhydrous organic solvent which is non-reactive with the reactants, such as anhydrous benzene, ethyl ether, butyl ether, toluene, xylene or mixtures thereof and at room temperature. The reaction, if desired, also can be initiated by the addition of a catalytic amount of iodine, amalgamated zinc or methylmagnesiumiodide and the yields improved by heating, preferably under reflux conditions, after the exothermic reaction between the reactants has subsided.

The intermediate zinc compound formed by the Reformatsky reaction is hydrolyzed by the addition of dilute acid, preferably a dilute mineral acid, and the ester thus formed extracted or separated from the organic layer by distillation. Saponification of the ester with a base selected from an alkali metal or alkaline earth metal base forms the corresponding salt which can be hydrolyzed to the free acid.

Alternatively, the alkali metal or alkaline earth metal salts can be prepared by known methods such as by neutralizing the free acid with the selected base, converting a water soluble salt, such as a sodium salt, to an insoluble salt by reaction with, e.g. calcium chloride, and the like.

The preparation of these compounds is more fully described in the following examples. It is to be understood, however, that the examples are illustrative of the method employed for their preparation and are not to be construed as limiting the invention to the particular reaction conditions specifically described.

EXAMPLE 1

*3-Hydroxy-3-p-Biphenylylheptanoic Acid*

Step A.—Dry, acid washed, granular zinc (24.5 g.) and a small crystal of iodine are placed in a three-necked flask fitted with a reflux condenser with calcium chloride drying tube, a stirrer, a dropping funnel and a heating mantle. A solution of 5 ml. of ethyl bromoacetate in 20 ml. of benzene is added and the mixture heated until the vigorous reaction commences. A solution of 59.6 g. of p-phenylvalerophenone and 66.2 g. of ethyl bromoacetate in 250 ml. of benzene then is added at a rate which maintains rapid refluxing without external heating. After 30 minutes, the addition is complete and the reaction mixture is stirred and heated under reflux for an additional two hours. The reaction mixture then is cooled to room temperature and poured into a well-stirred solution of 200 ml. of 10% sulfuric acid and 250 g. of ice. The benzene phase is separated and extracted with saturated sodium bicarbonate solution and water. The benzene solution is concentrated in vacuo at 50° C. until an orange-red liquid remains. On cooling, crystallization occurs. The crystalline product is recrystallized from 90% ethanol and ethyl 3-hydroxy-3-p-biphenylylheptanoate is obtained in the form of colorless needles melting at 59.5–60.5° C.

*Analysis.*—Calculated for $C_{21}H_{26}O_3$: C, 77.27; H, 8.03. Found: C, 76.99; H, 8.32.

Step B.—The ethyl 3-hydroxy-3-p-biphenylylheptanoate thus obtained (32.6 g.) is dissolved in 150 ml. of 5% potassium hydroxide made up in 90% ethanol. The resulting solution is allowed to stand for 72 hours at room temperature. Water (300 ml.) is added to the alkaline solution and the alcohol then is removed by vacuum concentration. The residual aqueous solution of potassium 3-hydroxy-3-p-biphenylylheptanoate is extracted with ether and then acidified with hydrochloric acid. 3-hydroxy-3-p-biphenylylheptanoic acid separates as a crystalline product which, after recrystallization from 50% aqueous ethanol, melts at 156–157° C.

*Analysis.*—Calculated for $C_{19}H_{22}O_3$: C, 76.48; H, 7.43. Found: C, 76.19; H, 7.65.

EXAMPLE 2

*Sodium Salt of 3-Hydroxy-3-Biphenylylheptanoic Acid*

Sodium hydroxide solution is added with stirring to a mixture of 3-hydroxy-3-biphenylylheptanoic acid in water until all of the oil dissolves in the form of the sodium salt which can be isolated by evaporation of the water.

EXAMPLE 3

*Calcium Salt of 3-Hydroxy-3-Biphenylylheptanoic Acid*

Calcium chloride is added slowly and with stirring at about 40° C. to an aqueous solution of the sodium salt obtained as described in Example 2, thus precipitating the insoluble calcium salt which is separated by filtration.

While the above examples describe the preparation of certain specific compounds, it is to be understood that the invention is not limited by these examples or by the specific reaction conditions described for the preparation of the compounds, but is understood to embrace variations and modifications falling within the scope of the appended claims.

What is claimed is:

1. A compound selected from the group consisting of 3-hydroxy-3-biphenylylheptanoic acid and the alkali metal and the alkaline earth metal salts thereof.
2. 3-hydroxy-3-biphenylylheptanoic acid.
3. Calcium salt of 3-hydroxy-3-biphenylylheptanoic acid.

References Cited in the file of this patent

Beilstein: Vol. IX, first supplement, p. 290 (1932).
Adams et al.: Organic Reactions, vol. 1, page 2 (1942).